US007899973B2

(12) United States Patent
Naruse et al.

(10) Patent No.: US 7,899,973 B2
(45) Date of Patent: Mar. 1, 2011

(54) INFORMATION PROCESSING DEVICE AND PROGRAM

(75) Inventors: Naoki Naruse, Yokohama (JP); Yuichi Ichikawa, Yokosuka (JP); Tatsuro Oi, Kawasaki (JP); Nobuyuki Watanabe, Sayama (JP); Yasunori Hattori, Fujisawa (JP); Masato Takeshita, Mitaka (JP); Masakazu Nishida, Yokosuka (JP); Mao Asai, Yokosuka (JP); Masayuki Tsuda, Tokyo (JP); Atsuki Tomioka, Yokohama (JP); Kazuhiro Yamada, Yokohama (JP); Satoshi Washio, Tokyo (JP); Dai Kamiya, Tokyo (JP); Naoki Yamane, Tokyo (JP); Keiichi Murakami, Ichikawa (JP)

(73) Assignee: NTT Docomo, Inc., Tokyo (JP)

( * ) Notice: Subject to any disclaimer, the term of this patent is extended or adjusted under 35 U.S.C. 154(b) by 0 days.

(21) Appl. No.: 12/049,060

(22) Filed: Mar. 14, 2008

(65) Prior Publication Data

US 2008/0177950 A1 Jul. 24, 2008

Related U.S. Application Data

(62) Division of application No. 10/815,187, filed on Mar. 31, 2004, now abandoned.

(30) Foreign Application Priority Data

Mar. 31, 2003 (JP) ................................ 2003-097144

(51) Int. Cl.
G06F 12/00 (2006.01)
G06F 13/14 (2006.01)
(52) U.S. Cl. .......................... 711/100; 711/118; 707/781

(58) Field of Classification Search .............. 707/9, 100, 707/781; 709/205, 246; 713/201, 193; 711/118, 711/100, 163
See application file for complete search history.

(56) References Cited

U.S. PATENT DOCUMENTS

| 4,674,055 A | 6/1987 | Ogaki et al. .................. 364/479 |
| 5,678,021 A | 10/1997 | Pawate et al. ................. 395/431 |
| 6,366,947 B1 | 4/2002 | Kavner ........................ 709/203 |
| 6,735,768 B1 | 5/2004 | Tanaka |
| 6,931,488 B2 | 8/2005 | Paulraj .......................... 711/118 |

(Continued)

FOREIGN PATENT DOCUMENTS

JP 63-014258 1/1988

(Continued)

OTHER PUBLICATIONS

"Applet Caching in Java Plug-in," Java.Sun.Com, Aug. 2000, XP002256443, 2 pgs.

(Continued)

*Primary Examiner* — Hung T Vy
(74) *Attorney, Agent, or Firm* — Brinks Hofer Gilson & Lione

(57) ABSTRACT

The present invention provides an information processing device for estimating usage of contents and properly limiting functions realized through use of the contents in accordance with the estimation. Usage of contents is estimated by determining in which of cache memory means and content storage means the contents are stored. When the contents are processed or executed, it is determined whether to limit functions realized through processing or execution of the contents, on the basis of the estimated usage of the contents and function limit information showing a rule regarding limits on functions realized through processing or execution. On the basis of the determination, the functions realized through processing or execution of the contents are limited.

8 Claims, 7 Drawing Sheets

U.S. PATENT DOCUMENTS

| | | | |
|---|---|---|---|
| 6,985,999 B2 * | 1/2006 | Henry et al. | 711/118 |
| 7,080,051 B1 | 7/2006 | Crawford | 705/400 |
| 2001/0049641 A1 | 12/2001 | Nakamura et al. | |
| 2001/0056462 A1 | 12/2001 | Kataoka | 709/203 |
| 2002/0069365 A1 * | 6/2002 | Howard et al. | 713/201 |
| 2002/0073235 A1 * | 6/2002 | Chen et al. | 709/246 |
| 2002/0143896 A1 | 10/2002 | Hansmann et al. | 709/218 |
| 2002/0184520 A1 | 12/2002 | Bush et al. | |
| 2003/0014496 A1 | 1/2003 | Spencer et al. | 709/217 |
| 2003/0037105 A1 | 2/2003 | Yamada et al. | 709/203 |
| 2003/0200405 A1 * | 10/2003 | Willman et al. | 711/163 |
| 2004/0006541 A1 * | 1/2004 | Huddelston et al. | 705/51 |
| 2004/0015965 A1 | 1/2004 | Sparks | 717/178 |
| 2004/0039929 A1 * | 2/2004 | Decime | 713/193 |
| 2004/0064507 A1 * | 4/2004 | Sakata | 709/205 |
| 2004/0078636 A1 | 4/2004 | Suzaki | |
| 2004/0111443 A1 | 6/2004 | Wong et al. | 707/202 |
| 2004/0230641 A1 | 11/2004 | Kasubuchi | 709/200 |
| 2004/0260793 A1 | 12/2004 | Ichikawa et al. | 709/219 |
| 2005/0044177 A1 | 2/2005 | Liebrand | 709/218 |
| 2005/0044191 A1 | 2/2005 | Kamada et al. | 709/223 |

FOREIGN PATENT DOCUMENTS

| | | |
|---|---|---|
| JP | H11-134155 | 5/1999 |
| JP | 2000-056895 | 2/2000 |
| JP | 2002-091458 | 3/2002 |
| TW | 522319 | 3/2003 |
| WO | WO 01/67785 A2 | 9/2001 |
| WO | WO 02/01319 A2 | 1/2002 |

OTHER PUBLICATIONS

JP Office Action in JP Appl. No. 2003-097143, dated Nov. 20, 2007, (w/full translation).

EP Office Action in EP Application No. 04007648.1, dated Jan. 2, 2007.

US Non-Final Office Action in U.S. Appl. No. 10/814,821, dated Apr. 5, 2006.

US Final Office Action in U.S. Appl. No. 10/814,821, dated Oct. 23, 2006.

US Non-Final Office Action in U.S. Appl. No. 10/814,821, dated Jul. 10, 2007.

US Final Office Action in U.S. Appl. No. 10/814,821, dated Feb. 7, 2008.

US Non-Final Office Action in U.S. Appl. No. 10/814,821, dated Aug. 1, 2008.

US Final Office Action in U.S. Appl. No. 10/814,821, dated Apr. 15, 2009.

* cited by examiner

```
<OBJECT declare id="application.declaration"
data="http://WWW.CCC.co.jp/cardgame/jam">
CARD GAME
</OBJECT>
SOFTWARE FOR~. CLICK<A ilet = "application.
declaration"> HERE</A>TO TRY.
```

```
* * * * * *
  CARD GAME
* * * * * *

. . . . . . . . . . . .
. . . . . . . . . . . .
. . . SOFTWARE FOR ~ .
CLICK HERE TO TRY.
```

BT2

| ITEM NAME | ESSENTIAL/ OPTION | DATA |
|---|---|---|
| AppName | ESSENTIAL | cardgame |
| PackageURL | ESSENTIAL | http://www.ccc.co.jp/cardgame.jar |
| AppClass | ESSENTIAL | |
| LastModified | ESSENTIAL | 2001/10/01 |
| AppSize | OPTION | |
| GetUTN | OPTION | |
| AccsessUserInfo | OPTION | |
| LaunchApp | OPTION | |
| GetSysInfo | OPTION | |
| userNetwork | OPTION | |
| IletPreserve | OPTION | |
| ⋮ | ⋮ | ⋮ |

| TRIAL API | PERMISSION |
|---|---|
| GetSysInfo() | × |
| GetUTN() | × |
| AccessUserInfo() | × |
| LaunchApp() | × |
| ⋮ | ⋮ |

INFORMATION PROCESSING DEVICE AND PROGRAM

This application is a divisional application of U.S. application Ser. No. 10/815,187, filed on Mar. 31, 2004 now abandoned (the entire content of which is hereby incorporated by reference), which claims priority under 35 U.S.C. §119 to Japanese Patent Application No. 2003-097144 filed Mar. 31, 2004, the entire content of which is hereby incorporated by reference.

TECHNICAL FIELD

The present invention relates to a technique regarding use of contents.

BACKGROUND ART

In recent years, various systems have been developed where contents such as game software are delivered from servers to communication devices via the Internet. Regarding the usage of contents in such systems, there are various possibilities, for example, a user may try out contents, or a user may store contents in the memory of a communication device and use the contents at any given time. In the above two cases, the intended purposes of using the contents are different In a case where a user tries out contents, he/she uses the contents to know what they are like. On the other hand, in a case where a user stores and uses contents, he/she uses the contents to benefit from the effects achieved through use of the contents.

In some of the above-mentioned systems, contents having same functions are always delivered regardless of differences in the intended purposes of using the contents. In those systems, a user may not be able to try out contents freely as shown by the following example. For example, in a case where a user tries out contents having a function of acquiring information specific to a communication device of the user such as personal information of the user, when the function is performed, a message is displayed for gaining permission from the user to acquire information specific to the communication device, in view of privacy and security of the user. In response to the message, the user needs to carry out an operation for accepting the contents of the message, when or before trying out the contents. As a result, trial use of contents by the user is interrupted temporarily; therefore, the user may not be able to freely try out the contents.

Also, in those systems, because contents having the same functions are always delivered regardless of the intended purpose of using the contents, even when contents are tried out, the effects of the contents originally for use are achieved, which may lower the value of contents provided.

Japanese Patent Application Laid-Open Publication No. 11-134155 discloses a technique for using application software whose usable functions are changed in accordance with the frequency of usage. Specifically, software disclosed in the publication includes a program for displaying an operation screen, and counts and stores frequency of usage for each function displayed on the operation screen. Each time the frequency of usage of a function exceeds a predetermined frequency, the software displays new contents on the operation screen additionally which are pre-stored in the software and have not been displayed, thereby renewing operational functions of the software.

However, the term "frequency of usage of contents" in the above publication is different from the term "usage of contents" stated above. Thus, the technique disclosed in the publication cannot solve the aforementioned problems resulting from the differences in intended purpose of using contents.

SUMMARY OF THE INVENTION

The present invention has been made in view of the problems stated above, and provides an information processing device which estimates usage of contents, and in accordance with the estimated usage, properly limits the functions realized through use of the contents.

To solve the above problems, the present invention provides an information processing device having cache memory means, acquiring means for acquiring contents which realize a function through processing or execution, first writing means for writing contents acquired by the acquiring means in a free space or a space, where some data is already stored, of the cache memory means, and content storage means for storing contents, the information processing device comprising: estimating means, when instructed to process or execute contents, for estimating whether the contents are for trial use, by determining in which of the cache memory means and the content storage means the contents are stored; content using means for reading contents instructed to be processed or executed from the cache memory means or the content storage means, and processing or executing the contents; determining means, when contents are processed or executed by the content using means, for determining whether to limit functions realized through processing or execution of the contents, on the basis of an estimation of the estimating means and function limit information showing a rule regarding limits on functions realized through processing or execution by the content using means; and limiting means for limiting functions realized through processing or execution by the content using means on the basis of a determination of the determining means.

In one preferred embodiment, when the estimating means estimates that the contents are for trial use, the determining means may determine to limit the functions of the contents; and when the estimating means estimates that the contents are not for trial use, the determining means may determine to disobey the function limit information.

In another preferred embodiment, the information processing device may further comprise operation means; deleting means, when a command is issued using the operation means for deleting contents stored in the content storage means, for freeing a storage space for storing the contents; and second writing means for writing contents acquired by the acquiring means in a free space or a storage space freed by the deleting means, and the acquiring means may acquire the contents via communication.

The present invention provides a program product for causing a computer having cache memory means, acquiring means for acquiring contents which realize a function through processing or execution, first writing means for writing contents acquired by the acquiring means in a free space or a space, where some data is already stored, of the cache memory means, and content storage means for storing contents, to execute: a process, when an instruction to process or execute contents are provided, of estimating whether the contents are for trial use, by determining in which of the cache memory means and the content storage means the contents are stored; a process of reading contents instructed to be processed or executed from the cache memory means or the content storage means, and processing or executing the contents; a process, when contents are processed or executed by the content using means, of determining whether to limit functions realized through processing or execution of the contents, on the basis of an estimation of the estimating means and function limit information showing a rule regarding limits on functions realized through processing or execution by the content using means; and a process of limiting functions realized through processing or execution by the content using means on the basis of a determination of the determining means. The program may be provided through a computer readable storage medium storing the program.

In the present invention, usage of contents is estimated by determining in which of cache memory means and content storage means the contents are stored. When the contents are processed or executed, it is determined whether to limit functions realized through processing or execution of the contents, on the basis of the estimated usage of the contents and function limit information showing a rule regarding limits on functions realized through processing or execution. On the basis of the determination, the functions realized through processing or execution of the contents are limited.

The present invention makes it possible to estimate usage of contents and properly limit functions realized through use of the contents in accordance with the estimation.

DESCRIPTION OF PREFERRED EMBODIMENTS

Figure 1:
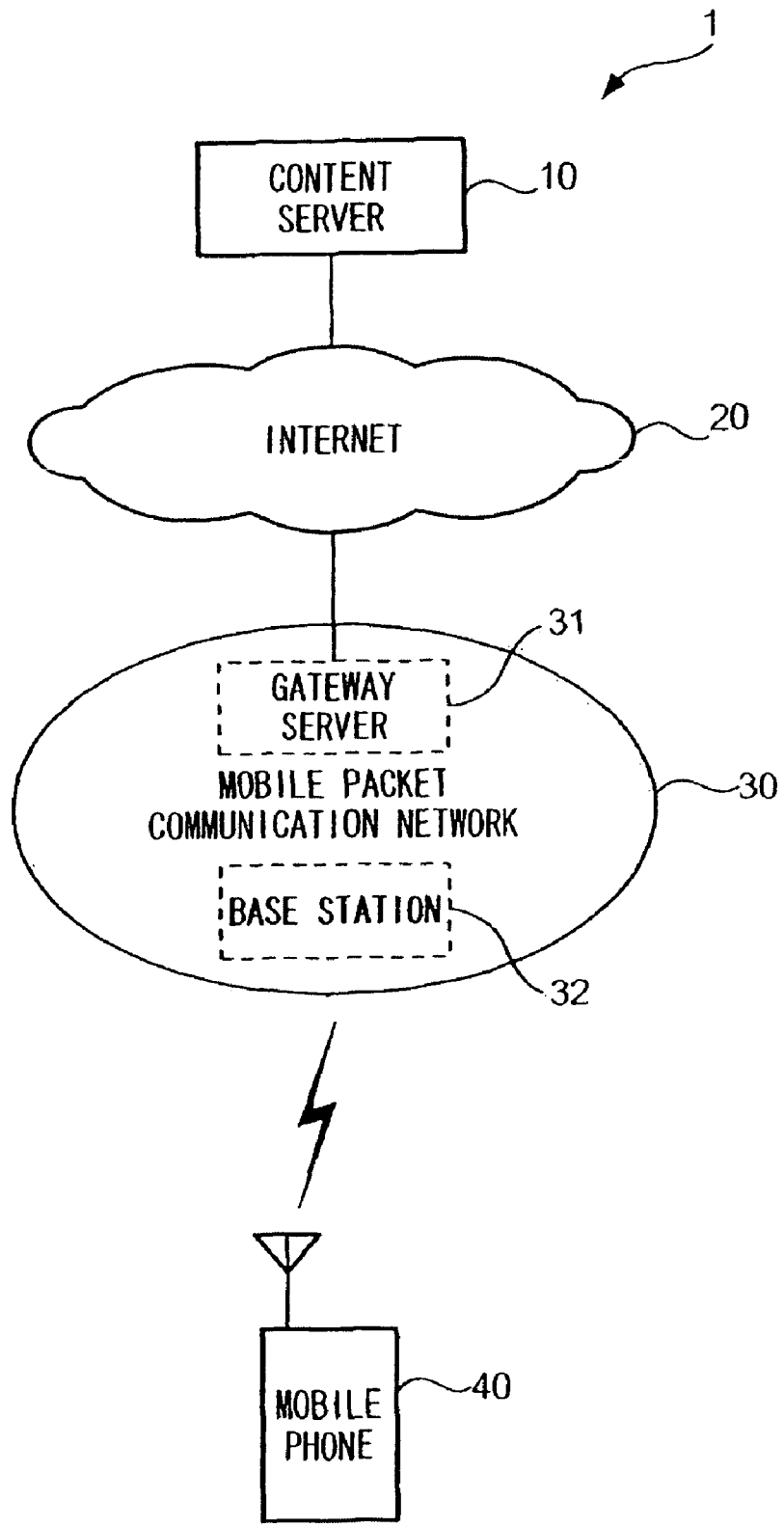
FIG. 1 is a block diagram showing an example of the configuration of communication system 1 according to an embodiment of the present invention.

Description will now be made of a preferred embodiment according to the present invention with reference to the attached drawings. In the drawings, like elements are denoted by like numerals. It is intended that the preferred embodiment be regarded as illustrative rather than limiting, and can be changed within the scope of the present invention.

1. Configuration

Configuration of Communication System 1:

FIG. 1 is a block diagram showing the configuration of communication according to the embodiment.

Mobile packet communication network 30 is a communication network for providing mobile packet communication services to mobile phone 40 served by mobile packet communication network 30. Mobile packet communication network 30 comprises gateway server 31 and base station 32. Many base stations 32 are provided in a communication service area of mobile packet communication network 30. Mobile phone 40, when located in a radio cell covered by base station 32, can perform radio communication with base station 32.

Gateway server 31 relays data between mobile packet communication network 30 and Internet 20.

Mobile phone 40 and content server 10 perform HTTP (Hyper Text Transfer Protocol) communication via Internet 20 and mobile packet communication network 30.

Configuration of Content Server 10:

Description will be made of the configuration of content server 10. The configuration of content server 10 is similar to that of common computers; therefore, only the configuration according to the present invention is described.

Content server 10 stores pieces of Java (registered trademark) AP software. Java AP software is software for enabling an application to be executed, and comprises a Java Archive (JAR) file containing a program written in the Java programming language and an Application Descriptor File (ADF) where information on the JAR file is described. In the present embodiment, Java AP software is treated as contents.

Figures 2, 3:
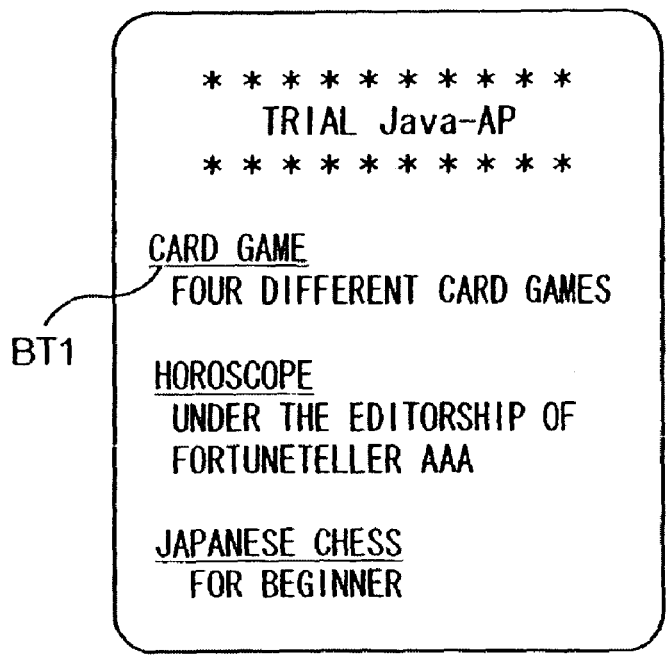
FIG. 2 is a diagram showing an example of a list page displayed in liquid crystal display unit 405 of mobile phone 40 according to the embodiment.
FIG. 3 is a diagram showing the contents of an explanatory file according to the embodiment.
Figures 4, 5:
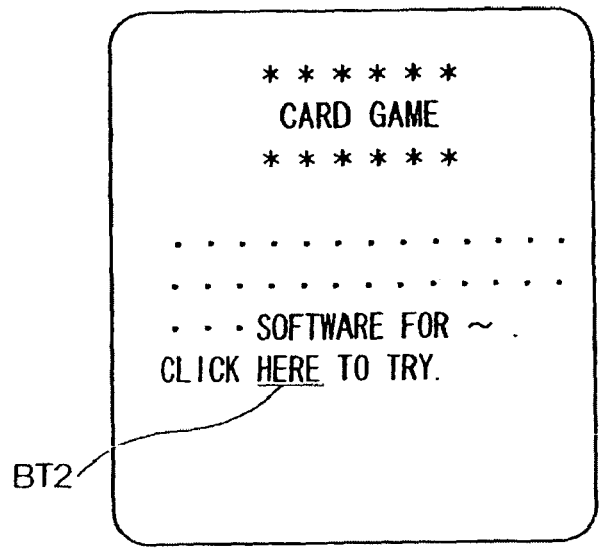
FIG. 4 is a diagram showing an example of an explanatory page displayed in liquid crystal display unit 405 of mobile phone 40 according to the embodiment.
FIG. 5 is a diagram showing an example of the data configuration of an ADF according to the embodiment.

Content server 10 also stores an explanatory file associated with Java AP software stored therein. The contents of an explanatory file are shown in FIG. 3. As shown in FIG. 3, ilet property is specified in an anchor tag (tag beginning with "<A"). When button BT2 shown in FIG. 4 is clicked, an object tag (tag beginning with "<OBJECT") is specified whose id property includes the value specified as the ilet property in the anchor tag. A URL (http://WWW.CCC.co.jp/cardgame/jam) specified as the data property of the object tag indicates a location for storing an ADF constituting Java AP software.

The explanatory file is written so as to provide the explanatory page shown in FIG. 4 when interpreted and executed by mobile phone 40.

Content server 10 also performs a function of sending Java AP software to mobile phone 40. Content server 10, upon receiving from mobile phone 40 an HTTP request message requesting Java AP software, reads an ADF constituting the Java AP software. Content server 10 then generates an HTTP response message including the read ADF, and sends it to mobile phone 40. Content sever 10, upon receiving from mobile phone 40 an HTTP request message requesting the JAR file corresponding to the ADF, reads the JAR file. Content server 10 then generates an HTTP response message including the read JAR file, and sends it to mobile phone 40.

Figures 6, 7:
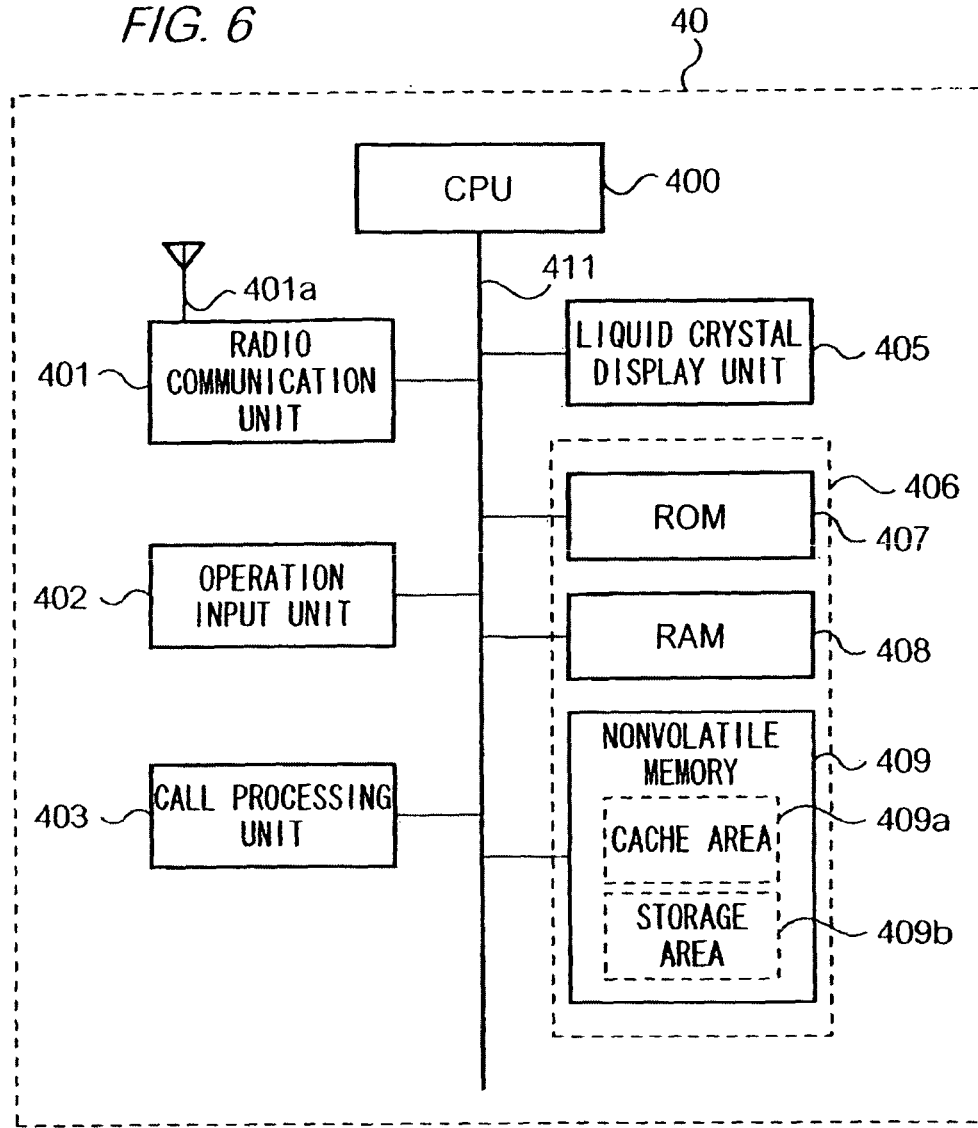
FIG. 6 is a block diagram showing an example of the hardware configuration of mobile phone 40 according to the embodiment.
FIG. 7 is a conceptual diagram showing the contents of function limit information according to the embodiment.

Configuration of Mobile Phone 40:

Description will be made of the configuration of mobile phone 40 with reference to FIG. 6. The configuration of mobile phone 40 is similar to that of common computers; therefore, only the configuration according to the present invention is described.

CPU 400 controls components of mobile phone 40 by executing a variety of programs stored in storage unit 406.

Storage unit 406 comprises Read Only Memory (ROM) 407, Random Access Memory (RAM) 408, and nonvolatile memory 409 such as an Electrically Erasable Programmable ROM (EEPROM).

ROM 407 stores programs such as an operating system for mobile phone 40, World Wide Web (WWW) browser software executed for downloading Java AP software, and software for establishing the runtime environment of Java AP software described later.

Nonvolatile memory 409 stores Java AP software, a variety of programs, and a variety of data. Nonvolatile memory 409 comprises cache area 409a for storing Java AP software temporarily and storage area 409b for storing Java AP software enduringly. Cache area 409a has areas to which memory addresses "adrs0001" to "adrs5000" are assigned. Storage area 409b has areas to which memory addresses "adrs500" to "adrs100000" are assigned. Nonvolatile memory 409 stores a memory management table (not shown) for managing address information of cache area 409a and storage area 409b. Specifically, the memory management table stores address information indicating correspondence between Java AP software and the memory address of the area storing the software. Address information is written in the memory management table when storage of Java AP software is instructed by CPU 400. Address information written in the memory management table is referred to when CPU 400 reads Java AP software.

Cache area 409a stores Java AP software downloaded from content server 10 for trial use in mobile phone 40. Java AP software stored in cache area 409a, upon exiting a program executed by CPU 400 for downloading the software, is deleted by CPU 400 from cache area 409a. It should be noted that deletion of Java AP software specifically means that a memory area for storing the software is cleared; therefore it becomes impossible to read the software, and the memory area becomes available for storing new data.

Storage area 409b stores Java AP software downloaded from content server 10, storage of which in mobile phone 40 is instructed by a user. Java AP software stored in storage area 409b, unless a user of mobile phone 40 directs deletion of the software, remains stored in storage area 409b.

Nonvolatile memory 409 also stores function limit table T1 for storing function limit information. The function limit information shows methods described later, calls of which are disabled during runtime of Java AP software stored in cache area 409a. The contents of function limit information are shown in FIG. 7 conceptually. In the function limit information of the FIG. 7, calls of the methods "GetSysInfo( )", "GetUTN( )", "AccessUserInfo( )", and "LaunchAPP( )" are disabled.

Function limit table T1 is used when CPU 400 realizes a limit function which will be described later.

Figure 8:
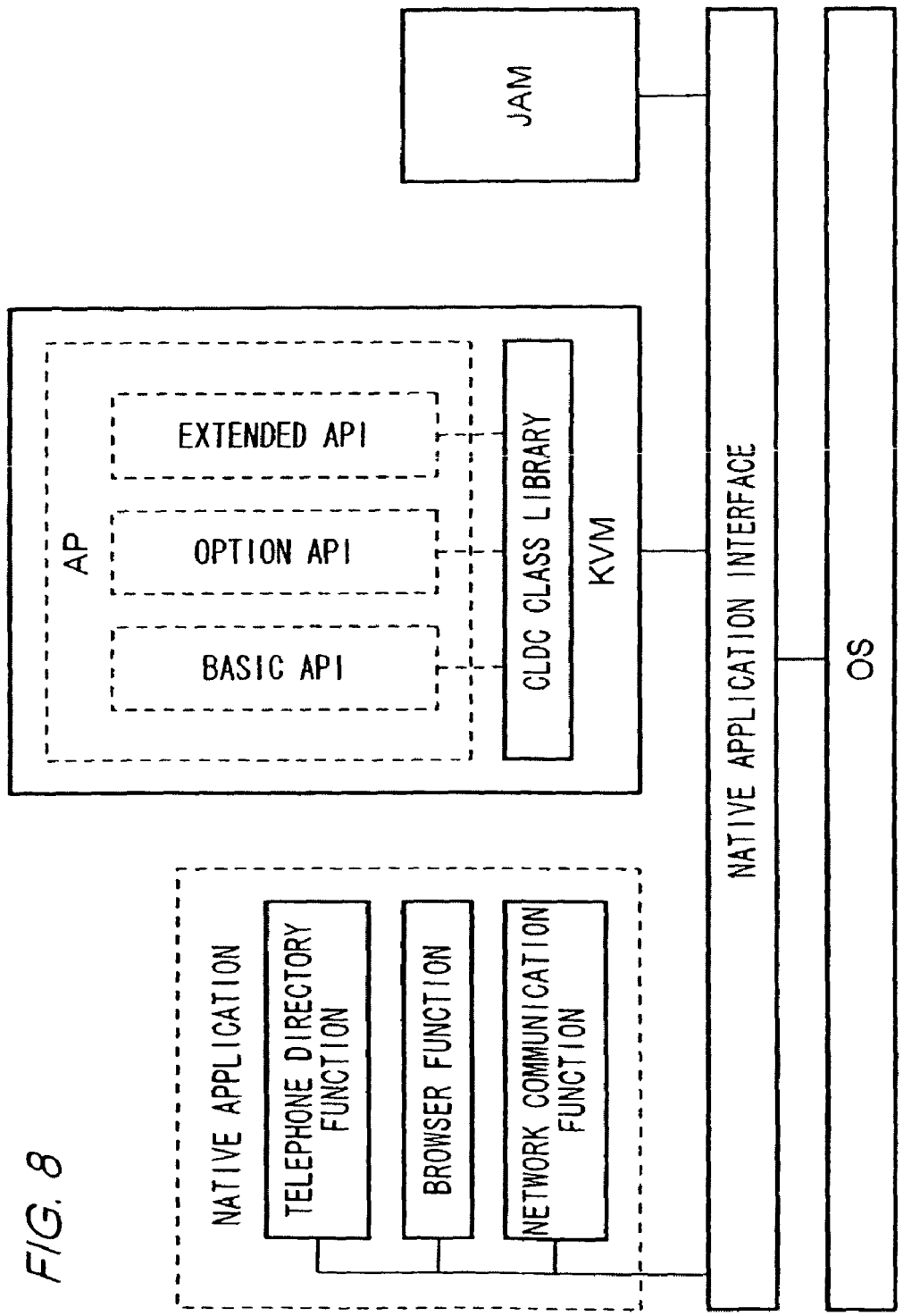
FIG. 8 is a block diagram showing an example of the Java Runtime Environment according to the embodiment.

Java Runtime Environment:

FIG. 8 is a diagram showing the runtime environment of Java AP software stored in mobile phone 40. As software for establishing the runtime environment of Java AP software, mobile phone 40 comprises the K Virtual Machine (KVM); the Connected Limited Device Configuration (CLDC) as a configuration; and native application interfaces.

The CLDC class library is a class library for the CLDC, and stores classes. A class includes methods such as "GetUTN ( )", "AccessUserInfo( )", "LaunchApp( )", and "GetSysInfo ( )". A method is called by CPU 400 through an application program interface (API). As a result, the function of the method is realized.

Mobile phone 40, by calling "GetUTN( )", realizes a function of acquiring serial number information of mobile phone 40 stored therein. Mobile phone 40, by calling "AccessUserInfo( )", realizes a function of referring to data on a user of mobile phone 40 stored therein. Mobile phone 40, by calling "LaunchApp( )", realizes a function of launching other applications. Mobile phone 40, calling "GetSysInfo( )", realizes a function of acquiring reception status information of e-mails and messages addresses to mobile phone 40.

A Java Application Manager (JAM) is software for enabling CPU 400 to manage Java AP software stored in mobile phone 40 under the control of an operating system. In accordance with instructions from the JAM, CPU 400 realizes the following functions.

CPU 400 realizes the functions of displaying a list of Java AP software stored in storage area 409b, managing execution (a start or forced termination, etc.) of Java AP software, storing or modifying Java AP software, deleting Java AP software stored in mobile phone 40, and monitoring the status of Java AP software.

As a characteristic function of the present embodiment, CPU 400, when executing Java AP software, also determines whether the software is stored in cache area 409a to estimate usage of the Java AP software. When CPU 400 determines that the Java AP software is stored in cache area 409a, CPU 400 realizes a limit function of limiting calls of methods from the software. When the limit function is realized, function limit information stored in function information table T1 is referred to.

CPU 400 also realizes a function, when an HTTP communication is established during Java AP software runtime, of suspending the running software.

As a characteristic function of the present embodiment, CPU 400, when instructed by a user to store Java AP software, which is read from cache area 409a and executed by CPU 400, determines whether an ADF constituting the software contains at least one of "GetUTN", "AccessUserInfo", "LaunchApp", and "GetSysInfo". When it is determined that at least one of them is contained in the ADF, CPU 400 causes liquid crystal display unit 405 to display a message saying, "This software may use information specific to this mobile phone. Do you want to proceed with this storage process?". When the user selects a "Yes" in response to the message, CPU 400 determines whether the ADF contains "useNetwork". When it is determined that "useNetwork" is contained in the ADF, CPU 400 causes liquid crystal display unit 405 to display a message saying "This software may access a network. Please select from: (a) permitting an access to a network, (b) not permitting an access to a network, or (c) confirming whether to permit an access to a network at each execution of the software". In accordance with an instruction from the user, CPU 400 sets a value as data corresponding to "useNetwork" of the ADF, and stores the Java AP software in storage area 409b.

As a result of the execution of the above software by CPU 400, a runtime environment for Java AP software is established. In such a runtime environment, when CPU 400 executes Java AP software, the function of the software is realized.

Configuration of ADF:

Description of an ADF will be made.

An ADF is a text file where a variety of control information are written for controlling storage, a start, and network access, etc. of a JAR file. The data configuration of an ADF is shown in FIG. 5. In the "Item Name" column of FIG. 5, names of control information are listed. In the "Essential/Option" column, information are listed which indicate whether essential or optional for an ADF. In the "Data" column, information on control information are listed.

Following brief description is made of each control information according to the embodiment. "AppName" is control information indicating the name of Java AP software, and information indicating the name is shown in the "Data" column of "AppName". "PackageURL" is control information indicating the Uniform Resource Locator (URL) of a location accessed for downloading a JAR file, and the URL of a location accessed for downloading a JAR file is shown in the "Data" column of "PackageURL". "AppSize" is control information indicating the data size of a JAR file, and data size is shown in the "Data" column of "AppSize".

"GetUTN" is control information designating whether CPU 400, during Java AP software runtime, acquires serial number information of mobile phone 40 stored therein. When "GetUTN" is contained in an ADF, CPU 400 acquires serial number information of mobile phone 40 by calling "GetUTN( )". On the other hand, when "GetUTN" is not contained in an ADF, CPU 400 does not call "GetUTN( )"; therefore, does not acquire serial number information of mobile terminal 40.

"AccessUserInfo" is control information designating whether CPU 400, during Java AP software runtime, refers to data on a user of mobile phone 40 stored therein. When "AccessUserInfo" is contained in an ADF CPU 400 refers to data on a user of mobile phone 40 by calling "AccessUserInfo( )". On the other hand, when "AccessUserInfo" is not contained in an ADF, CPU 400 does not call "AccessUserInfo( )"; therefore, does not refer to data on a user of mobile phone 40.

"LaunchApp" is control information designating whether CPU 400, during Java AP software runtime, can launch other Java AP software. When "LaunchApp" is contained in an ADF, CPU 400 calls "LaunchApp( )"; therefore, Java AP software can launch other Java AP software by calling. On the other hand, when "LaunchApp" is not contained in an ADF, CPU 400 does not call "LaunchApp( )"; therefore, Java AP software cannot launch other Java AP software.

"GetSysInfo" is control information designating whether CPU 400, during Java AP software runtime, acquires reception status information of e-mails and messages addressed to mobile phone 40. When "GetSysInfo" is contained in an ADF, CPU 400 acquires reception status information by calling "GetSysInfo( )". On the other hand, when "GetSysInfo" is not contained in an ADF, CPU 400 does not call "GetSysInfo( )"; therefore, does not acquire reception status information.

"UseNetwork" is control information indicating that CPU 400, during Java AP software runtime, may communicate with mobile packet communication network 30, and designating whether a user can select from: (a) permitting an access to a network, (b) not permitting an access to a network, or (c) confirming whether to permit an access to a network at each execution of the software. When "UseNetwork" is contained in an ADF, a user can make the above setting. On the other hand, when "UseNetwork" is not contained in an ADF, a user cannot make the setting. In a case where "UseNetwork" is contained in an ADF and a user selects (a) to permit an access to a network, a value "1" is set in the "Data" column of "UseNetwork". In a case where a user selects (b) not to permit an access to a network, a value "0" is set in the "Data" column. In a case where a user selects (c) to confirm whether to permit an access to a network at each execution, a value "2" is set in the "Data" column.

It should be noted that the control information as stated above is set by content providers providing Java AP software.

2. Operation

Following description of operations of the embodiment is made with reference to the drawings.

Figure 9:
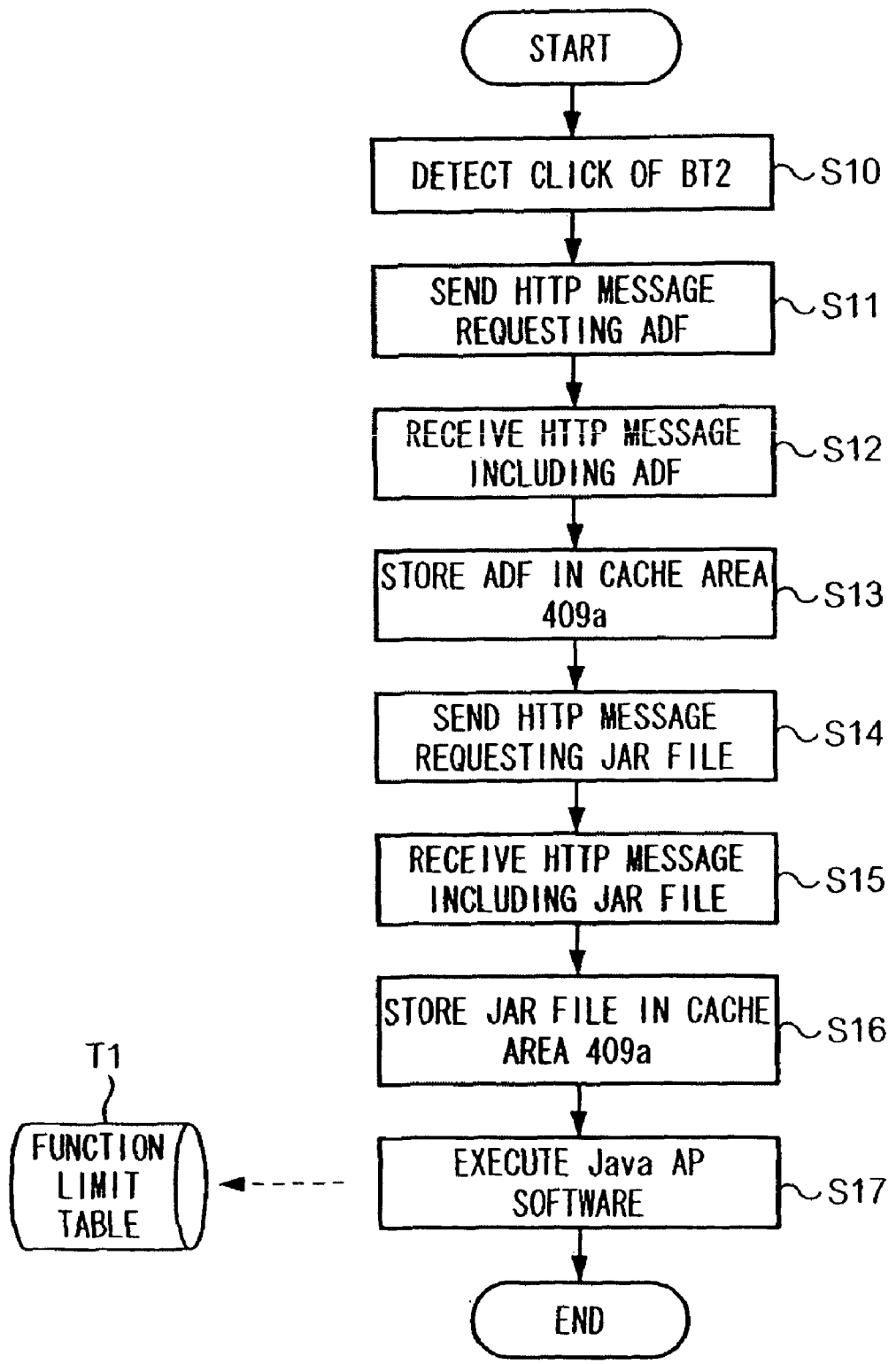
FIG. 9 is a flowchart illustrating an execution process performed by CPU 400 of mobile phone 40 according to the embodiment.

FIG. 9 is a flowchart illustrating an execution process performed by CPU 400 of mobile phone 40.

When a user instructs a WWW browser to start by operating operation input unit 402 of mobile phone 40, CPU 400 executes the WWW browser. CPU 400 performs operations in accordance with instructions from the WWW browser, as described below. When a user directs an access to content server 10 by inputting the URL of content server 10, CPU 400 starts to communicate with content server 11. When a list file (not shown) is received from content server 10, CPU 400 interprets and executes the list file, and causes liquid crystal display unit 405 to display the list page as shown in FIG. 2. The list page of FIG. 2 lists names of Java AP software. When the user clicks button BT1 on the list page indicating the name of desired Java AP software using operation input unit 402 (in this operation example, it is assumed that "Card Game" is clicked), CPU 400 detects the click of button BT1, and requests content server 10 to send the explanatory file as shown in FIG. 3 corresponding to the Java AP software. When the explanatory file is received from content server 10, CPU 400 interprets and executes the explanatory file, and causes liquid crystal display unit 405 to display the explanatory page as shown in FIG. 4.

When the user clicks button BT2 on the explanatory page using operation input unit 402, CPU 400 detects the click of button BT2 (Step S10), and identifies the anchor tag described in the explanatory file corresponding to button BT2, the value data specified as the ilet property is specified as id property of which, and extracts the URL specified as data property of the object tag. CPU then sends an HTTP request message requesting the ADF specified by the URL to content server 10 via mobile packet communication network 30 and Internet 20 (Step S11).

Content server 10, upon receiving the HTTP request message, reads the ADF requested by the message. Content server 10 generates an HTTP response message including the read ADF, and sends it to mobile phone 40.

CPU 400 of mobile phone 40, upon receiving the HTTP response message (Step S12), stores the ADF in cache area 409a (Step S13). When storing the ADF in cache area 409a, CPU selects, in accordance with a predetermined rule, an area for storing the ADF from among areas of nonvolatile memory 409 to which memory addresses "adrs0001" to "adrs5000" are assigned, and stores the ADF in the area. CPU 400 then writes address information identifying the area in a memory management table in association with the ADF.

CPU 400 extracts the PackageURL of the ADF; generates an HTTP request message requesting the JAR file specified by the PackageURL; and sends it to content server 10 (Step S14).

Content server 10, upon receiving the HTTP request message, generates an HTTP response message including the JAR file requested by the request message, and sends it to mobile phone 40.

CPU 400 of mobile phone 40, upon receiving the HTTP response message (Step S15), stores the JAR file included in the message in cache area 409a temporarily (Step S16).

CPU 400 reads the Java AP software with reference to the memory management table, and executes the software (Step S17). CPU 400, during the Java AP software runtime, monitors the status of the software in accordance with instructions from the JAM. When CPU 400 calls a method on the basis of information of the ADF constituting the Java AP software, CPU 400 refers to function limit table T1 in accordance with instructions from the JAM, and determines whether to call the method on the basis of information of function limit table T1. For example, when the ADF constituting the Java AP software contains "GetUTN", CPU 400, during the software runtime, acquires serial number information of mobile phone 40 by calling "GetUTN( )". However, in a case where CPU 400, when calling "GetUTN( )", refers to function limit table T1 in accordance with instructions from the JAM, and function limit table T1 indicates that a call of the method is disabled, CPU 400 does not call the method in accordance with instructions from the JAM. As a result, CPU 400 cannot realize the function of acquiring serial number information of mobile phone 40. CPU 400 then causes liquid crystal display unit 405 to display a message saying "This function cannot be used".

Also, in the cases of "AccessUserInfo( )", "LaunchApp( )", and "GetSysInfo( )", when calls of them are disabled in function limit table T1, CPU 400 does not call them in accordance with instructions from the JAM. Also, CPU 400, when an HTTP communication is established during Java AP software runtime, suspends the running software in accordance with instructions from the JAM.

As described above, functions of Java AP software read from cache area 409 are limited.

After the process of Step 17, when the user directs termination of the running Java AP software using operation input unit 402 of mobile phone 40, CPU 400 terminates the running software.

Figure 10:
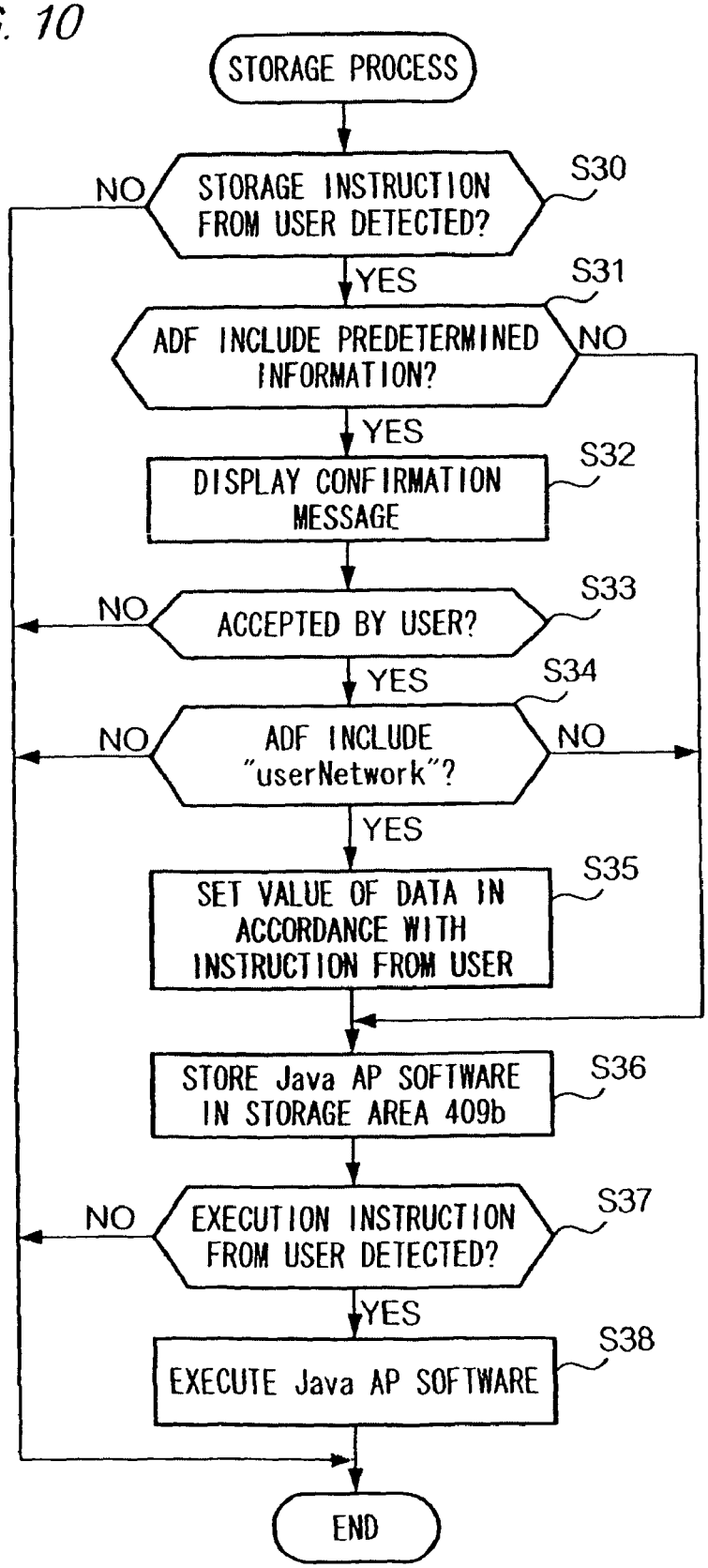
FIG. 10 is a flowchart illustrating a storage process performed by CPU 400 of mobile phone 40 according to the embodiment.

CPU 400 then performs the storage process as described below. The storage process is illustrated in the flowchart of FIG. 10.

CPU 400 causes liquid crystal display unit 405 to display a message saying "Do you want to store this application?".

When the user directs storage of the Java AP software by operating operation input unit 402 of mobile phone 40, CPU 400 detects the operation (Step S30); refers to the ADF of the software; and determines whether the ADF contains at least one of "GetUTN", "AccessUserInfo", "LaunchApp", and "GetSysInfo" (Step S31). When it is determined that the ADF contains at lease one of them, CPU 400 causes liquid crystal display unit 405 to display a message saying "This software may use information specific to this mobile phone. Do you want to proceed with this storage process?" (Step S32).

The reason for the determination in Step S31 is as follows: In a case where Java AP software is stored in cache area 409a, read from cache area 409a, and executed, calls of "GetUTN ( )", "AccessUserInfo( )", "LaunchApp( )", and "GetSysInfo ( )" as shown in function limit table T1 are disabled. As a result, information specific to mobile phone 40 is not acquired during the Java AP software runtime.

On the other hand, in a case where the Java AP software is stored in storage area 409b, read from storage area 409b, and executed, calls of the methods as shown in function limit table T1 are not disabled. As a result, when the ADF of the Java AP software contains "GetUTN", "AccessUserInfo", "LaunchApp", and "GetSysInfo", which indicate that the methods are called, information specific to mobile phone 40 can be acquired by calling the methods through an API. The acquisition of information specific to mobile phone 40 is concerned with privacy and security; therefore, needs to be approved by a user.

When the user selects to proceed with the storage process, in response to the message by operating operation input unit 402, CPU 400 detects the operation (Step S33), and determines whether the ADF contains "useNetwork" (Step S34). When it is determined that "useNetwork" is contained in the ADF, CPU 400 causes liquid crystal display unit 405 to display a message saying "This software may access a network. Please select from: (a) permitting an access to a network, (b) not permitting an access to a network, or (c) confirming whether to permit an access to a network at each execution of the software". When the user permits an access to a network, CPU 400 sets a value "1" as data corresponding to "useNetwork" of the ADF. When the user does not permit an access to a network, CPU 400 sets a value "0" as the data. When the user selects (c) to confirm whether to permit an access to a network at each execution of Java AP software, CPU 400 sets a value "2" as the data (Step S35).

The reason for the determination in Step S34 is as follows: In a case where Java AP software is stored in cache area 409a, read from cache area 409a, and executed, when an HTTP communication is established during the software runtime, the running software is suspended. As a result, during the Java AP software runtime, CPU 400 does not communicate with mobile packet communication network 30. On the other hand, in a case where the Java AP software is stored in storage area 409b, read from storage area 409b, and executed, CPU 400 is not disabled to communicate with mobile packet communication network 30 during the software runtime. Thus, when the ADF constituting the Java AP software contains "useNetwork", CPU 400 may communicate with mobile packet communication network 30 during the software runtime. The access to the network is concerned with privacy and security; therefore, needs to be approved by a user.

After the confirmation process stated above is carried out, CPU 400 stores the Java AP software in storage area 409b (Step S36), and writes address information associated with the software in the memory management table.

When the user directs termination of the WWW browser using operation input unit 402 of mobile phone 40, CPU 400 terminates the WWW browser. CPU 400 deletes the Java AP software stored in cache area 409a, and deletes from the memory management table the address information of cache area 409a associated with the software.

When the user directs execution of the Java AP software stored in storage area 409b by operating operation unit 402 of mobile phone 40, CPU 400 detects the operation (Step S37), and reads the software from storage area 409b and executes it (Step S38). During the execution process, as in the execution process described above, CPU 400 monitors the status of the Java AP software in accordance with instructions from the JAM. However, when CPU 400 calls a method on the basis of information described in the ADF constituting the Java AP software, unlike the execution process described above, CPU 400 does not refer to function limit table T1, and can call the method through an API. As a result, CPU 400 realizes the function of the method by calling the method.

With the above configuration, when using Java AP software stored in cache area 409a, a user can use the software without any interruptions. When using Java software stored in storage area 409b, a user can benefit from the effects of the functions realized through use of the software. In other words, it is possible to limit functions of contents properly in accordance with usage of the contents.

3. Modifications

In the forgoing, the embodiment of the present invention has been described. The embodiment is intended as illustrative, and the present invention can be implemented in various other embodiments without departing from the main characteristic of the invention. For example, modifications such as the following are possible.

Modification 1:

In the above embodiment, Java AP software written in the Java programming language is treated as contents. However, a programming language is not limited to the Java programming language, and may be the C++ language, etc.

Contents may be image data, video data, music data, or document data such as HTML data, instead of software. To enable mobile phone 40 to use the above contents, mobile phone 40 is configured to comprise a program and a unit for processing image data, video data, or music data, or a program for interpreting and displaying document data in liquid crystal display unit 405. The processing program is configured to have a function, when processing image data, video data, or music data stored in cache area 409a, of limiting functions realized by processing those data (for example, colors of a processed image or tones of a processed music are limited). Similarly, the display program is configured to have a function, when interpreting and displaying document data stored in cache area 409a, of limiting functions realized by interpreting and displaying the data (for example, colors or sizes of a displayed character are limited).

Modification 2:

In the above embodiment, Java AP software is downloaded from content server 10 to mobile phone 40; however, Java AP software may be delivered from content server 10 to mobile phone 40.

Modification 3:

In the above embodiment, Java AP software stored in cache area 409a may be reused as described below. As in the execution process of FIG. 9, when a user clicks button BT2 shown in FIG. 4, CPU 400 of mobile phone 40 detects the click, and determines whether the Java AP software associated with button BT2 is stored in cache area 409a. Only when it is determined that the Java AP software is not stored in cache area 409a, CPU 400 directs download of the software from content server 10. On the other hand, when it is determined that the Java AP software is stored in cache area 409a, CPU 400 reads the software from cache area 409a, and carries out the same process as the execution process of FIG. 9.

With the above configuration, before termination of a WWW browser, it is possible to reuse Java AP software downloaded from content server 10 and stored in cache area 409a. CPU 400 of mobile phone 40 then does not need to download Java AP software from content server 10 with each click of button BT2 by a user. As a result, it becomes possible to use Java AP software much faster and reduce unnecessary communication traffic.

Modification 4:

In the above embodiment, CPU 400 of mobile phone 40, when terminating a running WWW browser, deletes Java AP software stored in cache area 409a. However, CPU 400 may delete Java AP software in the order of ascending priorities, when the total data amount of Java AP software stored in cache area 409a reaches the capacity of cache area 409a. The order of ascending priorities is the order in which Java AP software is downloaded.

In the above configuration, when Java AP software is downloaded from content server 10 and stored in cache area 409a, the software is stored in association with the downloaded date.

Modification 5:

In a case where Java AP software is downloaded and stored in storage area 409b, before termination of a running WWW browser, the software is stored in both cache area 409a and storage area 409b. In this case, when instructed to execute the Java AP software, CPU 400 of mobile phone 40 may execute the software stored in cache area 409a.

Modification 6:

In the above embodiment, a computer without a communication function may be used as an information processing device, instead of a mobile phone with a communication function.

In the case of a computer without a communication function, Java AP software is pre-stored in cache area 409 of the computer. When Java AP software is copied or moved into the computer via an external storage, the software can be stored in only cache area 409 of the computer. When the total data amount of Java AP software stored in cache area 409a reaches the capacity of cache area 409a, Java AP software stored therein is deleted in the order of ascending priorities. Java AP software stored in cache area 409a can be stored in storage area 409b in accordance with an instruction from a user. The copying or moving of Java AP software stored in storage area 409 is restricted.

With the above configuration, a computer without a communication function can limit functions of Java AP software stored in cache area 409a.

Modification 7:

In the above embodiment, in nonvolatile memory 409 of mobile phone 40, cache area 409a and storage area 409b may not be assigned. CPU 400, when storing in nonvolatile memory 409 Java AP software downloaded from content server 10, associates with the software storage identification data (for example, a memory flag "( )") indicating that the software is stored temporarily. In the storage process as shown in FIG. 9, when a user directs storage of Java AP software, the software is not deleted from nonvolatile memory 409, but the storage identification data corresponding to the software is modified to storage identification data indicating that the software is stored enduringly (for example, the memory flag is modified from "0" to "1"). On the other hand, when the user does not direct storage of the software, after a running WWW browser is terminated, the software associated with the memory flag "0" is deleted from nonvolatile memory 409.

With the above configuration, areas of nonvolatile memory 409 for storing Java AP software can be used effectively.

Modification 8:

In the above embodiment, function limit table T1 is pre-stored in nonvolatile memory 409. However, it is possible to include function limit information in a JAR file stored in content server 10, and, when the JAR file is executed, to limit calls of methods in accordance with the function limit information included in the JAR file.

Function limit information is not limited to those stated in the embodiment, may be those, for example, for limiting a call of a method for using a scratchpad or a method for using a version upgrade method.

Modification 9:

Software such as JAM software or operating system software executed by CPU 400 of mobile phone 40 in the above embodiment can be provided to mobile phone 40 through a CPU 400 readable storage medium storing the software such as a magnetic recording medium, a magneto-optical recording medium, or ROM. The software also can be downloaded to mobile phone 40 via a network such as the Internet.

What is claimed is:

1. A computer readable memory storage device for use in a mobile communication device, the computer readable memory storage device configured to store instructions that are executable by a processor included in the mobile communication device, the computer readable memory storage device comprising:
   a first storage area, a second storage area, and a third storage area first storage area being a storage area for temporarily storing a content, and the second storage area being a storage area for enduringly storing the content;
   instructions stored in the third storage area that are executable by the processor to start execution of a browser to receive an application and a control file relevant to the application from a content server, the application including at least one subroutine executable by the mobile communication device;
   instructions stored in the third storage area that are executable by the processor to store the received application and the received control file in the first storage area, wherein the application stored in the first storage area is deleted when the execution of the browser is terminated;

instructions stored in the third storage area that are executable by the processor to store the application stored in the first storage area, in the second storage area in response to detection of a user input indicative of an instruction to store the application in the second storage area, and confirmation that the control file stored in the first storage area does not include a predetermined subroutine;

instructions stored in the third storage area that are executable by the processor to determine in which of the first storage area and the second storage area the received application is stored;

instructions stored in the third storage area that are executable by the processor, if it is determined that the received application is stored in the first storage area, to compare a subroutine included in the application with a listing of disallowed subroutines stored in the mobile communication device, and to prohibit execution of the subroutine if the subroutine matches at least one disallowed subroutine included in the listing of disallowed subroutines; and instructions stored in the third storage area that are executable by the processor, if it is determined that the received application is stored in the second storage area, to allow execution of the at least one subroutine included in the application, without referring to the listing of disallowed subroutines.

2. The computer readable memory storage device of claim 1, wherein the predetermined subroutine comprises at least one of a function to obtain serial number information of the mobile communication device, a function to refer to data on a user of the mobile communication device, a function of launching another application, and a function of obtaining information on reception status of messages addressed to the mobile communication device.

3. The computer readable memory storage device of claim 1, wherein the application comprises instructions written in a Java® programming language.

4. The computer readable memory storage device of claim 3, wherein the control program is an application descriptor file written in the Java® programming language.

5. A method for managing execution of content on a mobile communication terminal, the mobile communication terminal comprising a first storage area and a second storage area, the first storage area being a storage area for temporarily storing a content, and the second storage area being a storage area for enduringly storing the content, the method comprising:

executing an operating system specific to the mobile communication terminal with a processor executable in the mobile communication terminal;

starting execution of a browser with the processor to receive an application and a control file relevant to the application from a content server, the application including at least one subroutine executable by the mobile communication terminal;

the processor storing the received application and the received control file in the first storage area, wherein the application stored in the first storage area is deleted when execution of the browser is terminated;

the processor storing the application stored in the first storage area in the second storage area, if a user input indicative of an instruction to store the application stored in the first storage area in the second storage area is received by the processor, and if the control file relevant to the application stored in the first storage area does not include a predetermined subroutine;

determining with the processor whether the received application is stored in the first storage area or the second storage area;

the processor comparing a subroutine included in the application with a listing of disallowed subroutines stored in the mobile communication terminal if it is determined by the processor that the received application is stored in the first storage area;

the processor prohibiting execution of the subroutine if the subroutine matches at least one disallowed subroutine included in the listing of disallowed subroutines; and the processor allowing execution of a subroutine included in the application, without referring to the listing of disallowed subroutines if it is determined by the processor that the received application is stored in the second storage area.

6. The method of claim 5, wherein the predetermined subroutine comprises at least one of a function of obtaining serial number information of the mobile communication terminal, a function of referring to data on a user of the mobile communication terminal, a function of launching another application, and a function of obtaining information on reception status of messages addressed to the mobile communication terminal.

7. The method of claim 5, wherein the application comprises instructions written in a Java® programming language.

8. The method of claim 7, wherein the control program is an application descriptor file written in the Java® programming language.

* * * * *

UNITED STATES PATENT AND TRADEMARK OFFICE
CERTIFICATE OF CORRECTION

PATENT NO. : 7,899,973 B2
APPLICATION NO. : 12/049060
DATED : March 1, 2011
INVENTOR(S) : Naoki Naruse et al.

It is certified that error appears in the above-identified patent and that said Letters Patent is hereby corrected as shown below:

In the Claims

In Column 12, line 55, insert --, the-- after the first occurrence of "area".

Signed and Sealed this
Twenty-sixth Day of April, 2011

David J. Kappos
*Director of the United States Patent and Trademark Office*